United States Patent [19]

Horikawa

[11] Patent Number: 5,222,285
[45] Date of Patent: Jun. 29, 1993

[54] PALLET STORAGE DEVICE AND A PALLET EXCHANGE DEVICE FOR A MACHINE TOOL, AND A LATHE WITH AN AUTOMATICALLY REMOVABLE PALLET

[75] Inventor: Yoshiharu Horikawa, Shimizu, Japan

[73] Assignee: Matsuura Machinery Corporation, Fukui, Japan

[21] Appl. No.: 716,029

[22] Filed: Jun. 14, 1991

[30] Foreign Application Priority Data

Jun. 20, 1990 [JP] Japan .................................. 2-161517

[51] Int. Cl.$^5$ ........................................... B23Q 41/02
[52] U.S. Cl. ...................... 29/33 P; 29/563; 198/346.1; 414/223; 414/331; 82/124
[58] Field of Search ................... 29/33 P, 563; 82/125, 82/124; 414/331, 223; 198/346.1

[56] References Cited

U.S. PATENT DOCUMENTS

| | | | |
|---|---|---|---|
| 3,561,618 | 2/1971 | Lindbom | 414/223 |
| 4,065,988 | 1/1978 | Lohneis et al. | 82/125 |
| 4,404,727 | 9/1983 | Zankl | 82/124 X |
| 4,457,659 | 7/1984 | Watanabe | 414/223 |
| 4,558,506 | 12/1985 | Kielma | 29/33 P X |
| 4,637,108 | 1/1987 | Murata et al. | 29/33 P |
| 4,646,422 | 3/1987 | McMurtry | 82/125 |
| 4,726,721 | 2/1988 | Heel et al. | 279/1 TS |
| 4,985,971 | 1/1991 | Kitamura | 29/33 P |
| 4,991,706 | 2/1991 | Kitamura | 29/33 P |

FOREIGN PATENT DOCUMENTS

| | | | |
|---|---|---|---|
| 224931 | 6/1987 | European Pat. Off. | 414/223 |
| 234653 | 4/1986 | Fed. Rep. of Germany | 414/223 |
| 271073 | 8/1989 | Fed. Rep. of Germany | 414/223 |
| 1131 | 1/1984 | Japan | 29/563 |
| 42204 | 3/1984 | Japan | 82/124 |
| 259348 | 12/1985 | Japan | 29/563 |
| 262705 | 12/1985 | Japan | 414/331 |
| 48442 | 3/1987 | Japan | 198/346.1 |
| 1364442 | 1/1988 | U.S.S.R. | 29/563 |

Primary Examiner—Z. R. Bilinsky
Attorney, Agent, or Firm—Jordan and Hamburg

[57] ABSTRACT

A plurality of pallets for exchanging and fixing workpieces are placed on a plurality of respective tables supported vertically with spacing between one another, and the tables are rotated to transfer a required pallet to the predetermined exchange position to perform an exchange operation of the pallet by a pallet exchange device.

5 Claims, 9 Drawing Sheets

PALLET STORAGE DEVICE AND A PALLET EXCHANGE DEVICE FOR A MACHINE TOOL, AND A LATHE WITH AN AUTOMATICALLY REMOVABLE PALLET

FIELD OF THE INVENTION AND RELATED ART STATEMENT

The present invention relates to a pallet storage device for a machine tool which can removably store pallets with workpieces fixed, to supply raw materials to the machine tool and receive machined workpieces from the machine tool.

The present invention relates to a pallet exchange device for a machine tool which can store a number of pallets with workpieces attached and can automatically exchange pallets for a machine tool.

Further, the present invention relates to a lathe for which a pallet can be automatically removed/attached.

For machine tools, there are pallet storage devices available for storing a plurality of pallets with raw materials fixed, supplying pallets one by one to a machine tool and returning respective pallets with a machined workpiece attached to automatically exchange machined workpieces.

For large workpieces and workpieces to be precisely machined, machine tools can be automatically operated without an operator attended for a long time, by making automatic pallet exchange using a pallet storage device which can store as many as ten pallets. On the other hand, for small workpieces which may be respectively machined in so short time as 5 to 20 minutes, if no-operator-attended operation is wanted for a long time, the number of pallets to be housed in the pallet storage device must be increased to a great number. For example, in a case of a workpiece on a pallet to be machined in 10 minutes, if a pallet storage device can store as many as 100 pallets, the device can make no-operator-attended operation as long as 1000 (100×10) minutes (16.7 hours).

However, if such a pallet storage device as can store as many as 100 pallets is used for a long no-operator-attended operation, a space occupied by the pallet storage device becomes too large for a small workpiece or for a small machine tool.

On the other hand, there are lathes commonly available which clamp a workpiece to be machined with main spindle chuck, turn the workpiece by the spindle and machine the workpiece with reciprocating tools.

Recent machine tools widely use a machining center which fixes a workpiece and a tool on respective pallets, and automatically exchanges the workpiece and tool by an automatic exchange of the pallets for automatically machining the workpieces. Milling and drilling operation can use the machining center for automatic machining, and further can automatically and continually make different types of machining by placing a pallet exchange device to automatically exchange pallets with workpieces attached from a machine tool to another machine tool and so on.

According to the prior art, the lathes are so designed as to clamp a workpiece directly with chuck for machining. Therefore, man must necessarily intervene between a machining operation on a machine tool having the machining center and a following machining operation on a lathe for preparatory work. In other words, according to the prior art, a workpiece, which must be machined on a machine tool having the machining center and then on a lathe or vice versa, cannot be automatically and continuously machined without man attended.

OBJECT AND SUMMARY OF THE INVENTION

First, the present invention intends to provide a pallet storage device for machine tools which can eliminate the above problems to store a number of pallets with a small dedicated space.

Secondly, the present invention intends to provide a pallet exchange device for machine tools which can eliminate the above problems to exchange a number of pallets with a small dedicated space.

Thirdly, the present invention intends to provide a lathe which can eliminate the above problems to automatically remove and attach pallets.

According to the present invention, since a plurality of tables are supported by a rotary stanchion, even if the number of pallets to be stored in one table is as small as the prior art, the number of pallets to be stored in a machine tool can be increased by the number of tables. During the pallet exchange operation, an exchange arm is moved vertically to take out a pallet on a relevant table, the pallet removed is fed to the machine tool, and, after the end of the machining, the pallet with the machined workpiece thereon is again taken out of the machine tool to be returned to a home table.

The invention can provide a plurality of pallet attaching sections on one table. Even if the number of pallets to be stored on one table is as small as 10, 10 tables on a machine tool can store as many as 100 pallets, and the total system occupies only a dedicated space as small as that required when only one table is provided to store 10 pallets.

One embodiment of the invention provides a pallet exchange section for a machine tool, a plurality of pallet storage devices and a preparatory device (if desirable) around the exchange arm device, and the pallet storage device include a rotary table with a plurality of pallet attaching sections arranged in a circular shape. Therefore, with a minimum range of movements consisted of rotation, lifting/lowering and an elongation/contraction of a grip arm, the exchange arm device can take out a desirable pallet on the pallet storage device, to install it on the machine tool, and to take out a machined workpiece from the machine tool to return the workpiece to a home position on the pallet storage device.

Further, the exchange arm device can make a pallet exchange operation by the movements limited in the compact space, and the plurality of pallet storage devices including rotary tables can be disposed in an essentially circular circumference of the exchange arm device, thus making an effective use of dedicated space, resulting in a storage of many pallets in a narrow space. It also brought about no-man-attended operation can be made for a long time, even for workpieces requiring a short machining time.

The invention may provide a lathe, wherein a pallet can be attached to a main spindle. The pallet provided with a mounting for fixing a workpiece and a pallet holder fixed to the mounting is supported by an arm of an exchange arm device. The pallet holder is provided with a tapered shaft portion which can be inserted into an insertion portion formed in the main spindle. The shaft portion of the pallet holder is inserted into the insertion portion by the arm of the exchange arm device. Then, a clamp device in the spindle stock clamps the holder to draw the pallet far inside, thus fixing the pallet to the main spindle.

When exchanging pallets, the clamp device relieves the clamp force. The exchange arm device takes out the pallet carrying a machined workpiece thereon, and proceeds to a next operation, to fix a pallet carrying an unmachined workpiece thereon onto the main spindle.

DESCRIPTION OF THE PREFERRED EMBODIMENTS

Figure 1:
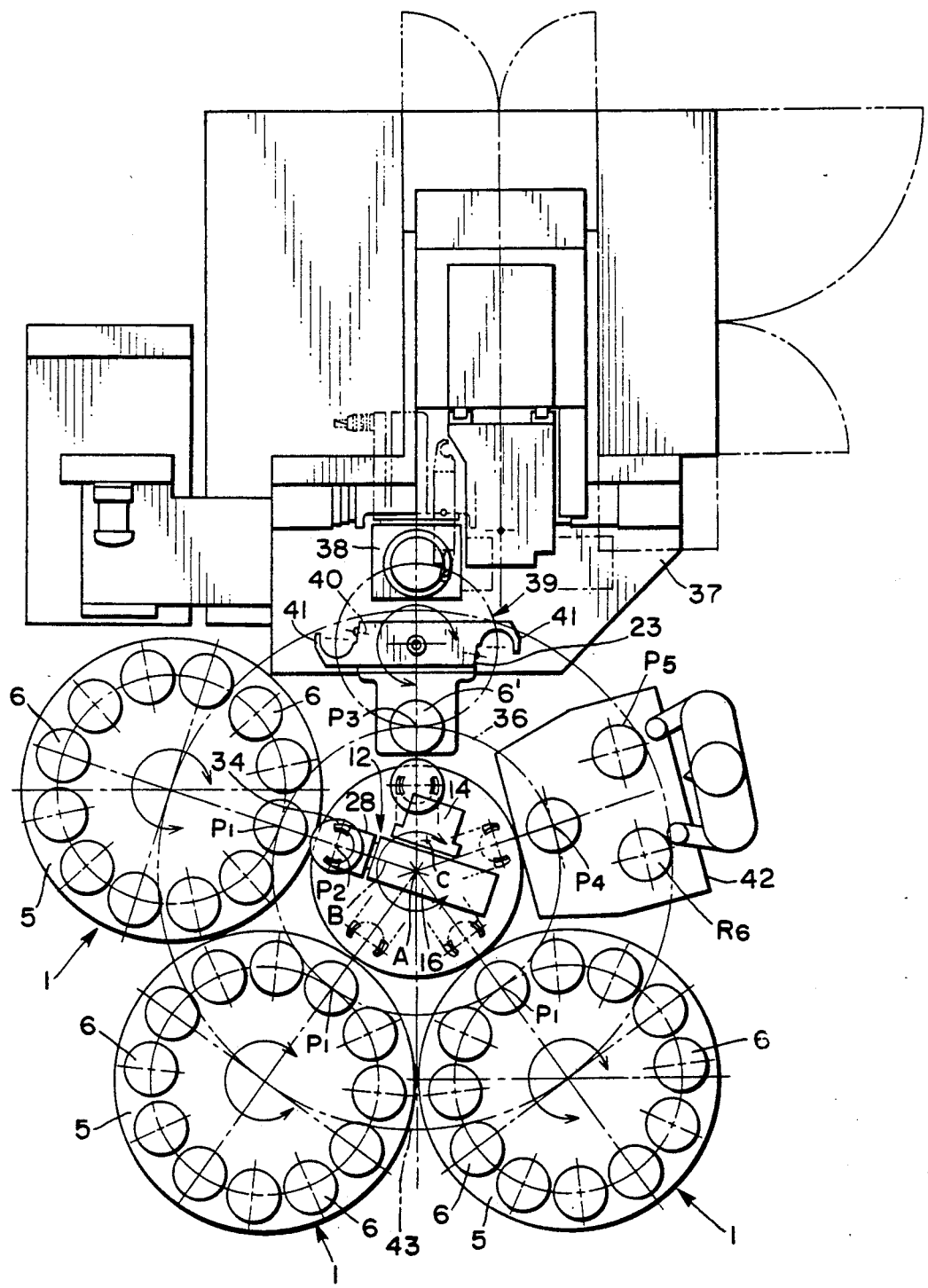
FIG. 1 is a plan view showing a machining system provided with a pallet storage device according to the present invention.
Figure 2:
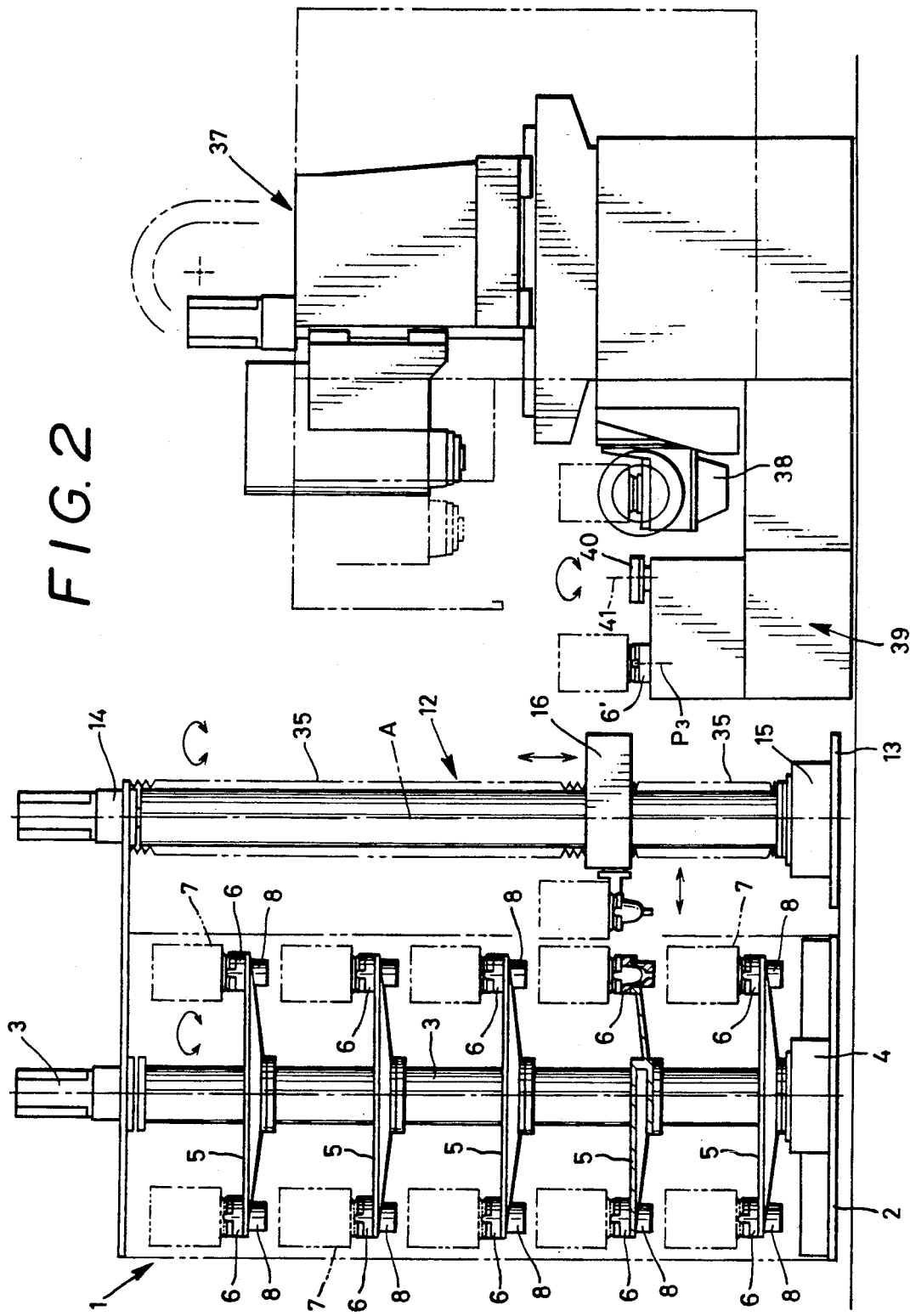
FIG. 2 is a right side view showing the above machining system shown in FIG. 1.

Now preferred embodiments according to the present invention will be described referring to the attached drawings:

FIGS. 1 and 2 shows pallet storage devices 1 according to the invention, each of which consists of a bed 2, a stanchion 3 rotatably supported on the bed 2, a drive 4 supported on the bed 2 to rotate the stanchion 2, and a plurality (here 5 pieces) of tables 5 arranged vertically with spacing placed between one another and supported by the stanchion 3.

The drive 4 consists of a motor and a gearing or a drive such as a belt wrapping drive transmitting the rotation of the motor shaft to the stanchion 3 to rotate it.

The plurality of tables 5 may be fixed around the stanchion 3 to be rotated together with the stanchion 3, but otherwise they may be rotatably (loosely) supported by the stanchion 3 and independently rotated by a plurality of table drives provided in or out of the stanchion 3. The table drive can be constructed with a motor and a gearing or a drive such as a belt wrapping drive. Further, there may be a modification of them in which a normal/reverse rotation of the stanchion 3 driven by the drive 4 is transmitted to each table 5 through a gearing and a clutch or other transmission disconnecting/connecting device. Using a clutch, a table 5 to be used is rotated only for an angle required. Tables 5 may be so constructed as to be supported by the stanchion 3 interchangeably with one another.

Each table 5 is provided thereon with a plurality (here 12 pieces) of pallet mounting sections 6 arranged on a pitch circle coaxial with the stanchion 3. Each table 5 has the same or different geometry, and the pitch circle diameter of the pallet mounting sections 6 may be the same or different from one another. In this embodiment, the table 5 is of circular shape, however the shape is not limited to a disk, but may be of a polygon whose number of sides may depend on the number of pallet mounting sections 6.

A holding member 8 is formed on one end of each pallet mounting section 6, to secure a pallet 7 so as not to be loosened out.

Figure 3:
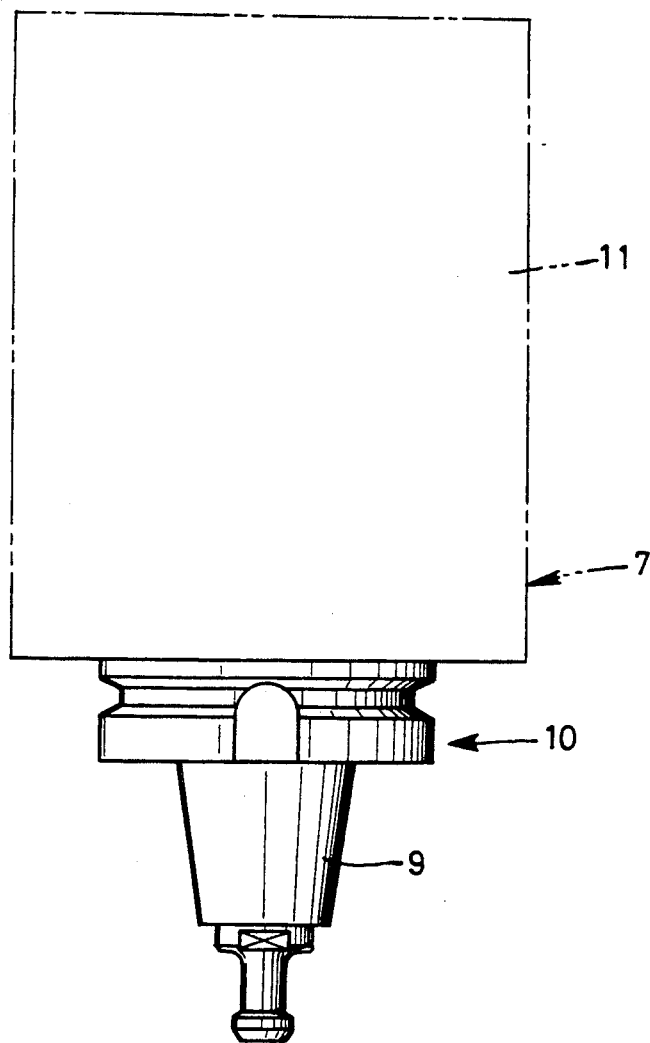
FIG. 3 is a front view showing a pallet with a workpiece attached.

For an example of pallet 7 as shown in FIG. 3 which has a holder 10 including a tapered shaft portion 9, available is a well known holding member 8 into which the holder 10 is inserted and locked. When another shape of pallet 7 is used, a holding member 8 is so designed as to fit the shape, and used to lock the pallet. A workpiece 11 or raw material to be machined is fixed to the pallet 7.

The number of pallet storage devices 1 prepared in advance may be only one for a machine tool, but as shown in FIG. 1, a plurality (e.g., three) of pallet storage devices 1 may be arranged around an exchange arm device 12.

The exchange arm device 12 has a bed 13, a rotary stanchion 14 supported on the bed 13 so as to be rotated about a rotation axis A, a drive 15 for rotating the rotary stanchion 14, and an arm 16 which can rotate only together with the rotation of the rotary stanchion 14 and can move up and down along the rotary stanchion 14.

The drive 15 may be composed of a pulse motor directly driving the rotary stanchion 14, or composed as a device which can index an angle using a servo motor and a gearing or other transmission.

Figure 4:
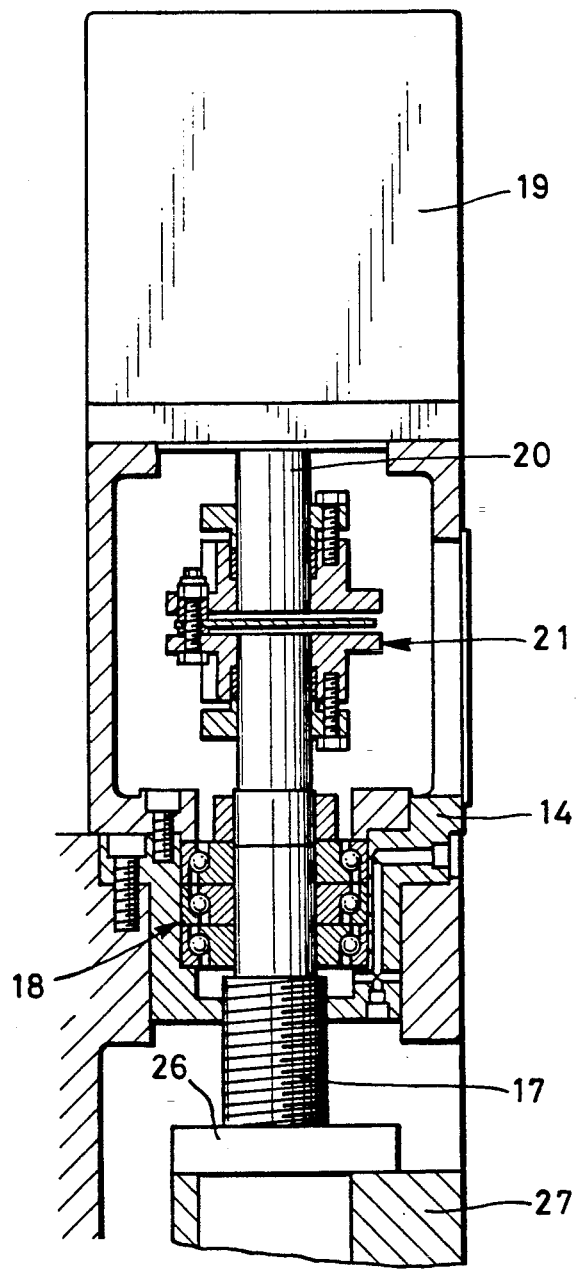
FIG. 4 is a fractionally sectional view showing one part of the top end of a rotary stanchion of the exchange arm device.
Figure 5:
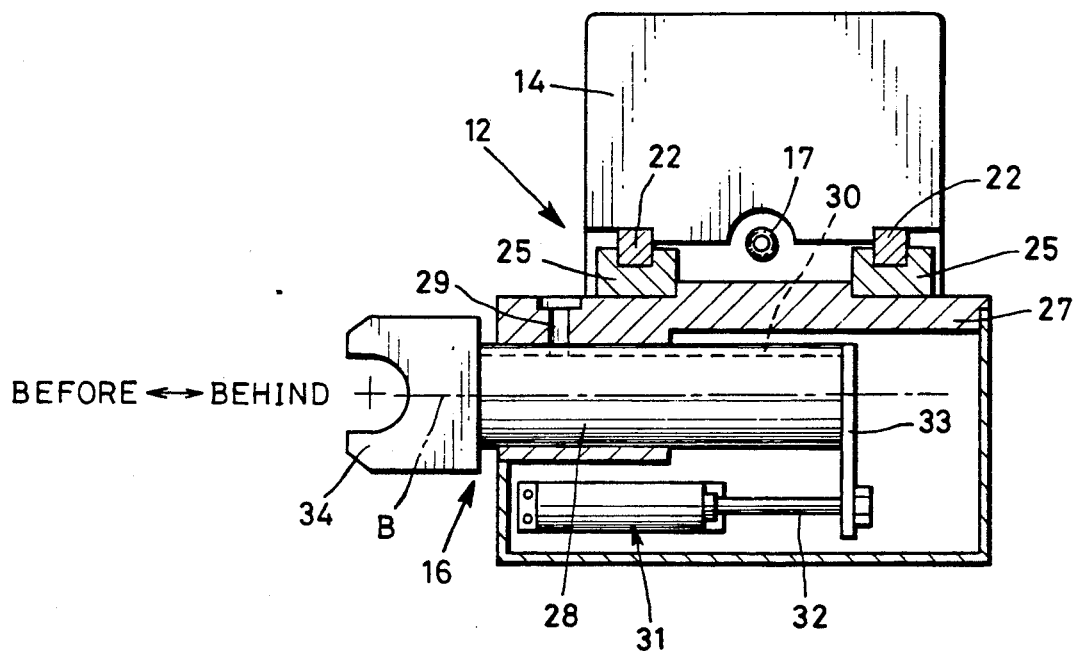
FIG. 5 is a sectional view showing a part of the arm.

As shown in FIGS. 4 and 5, a ball screw 17 standing on the rotary stanchion 14 and extending along a rotation axis C away from and parallel to the rotation axis A is rotatably supported by a bearing 18. The bearing 18 is mounted in the casing of the rotary stanchion 14. One end of the ball screw 17 is connected by a coupling 21 with an output shaft 20 of a motor 19 fixed to e.g., the top end of the rotary stanchion 14, so that the ball screw 17 is rotated by the motor 19.

Rails 22 (e.g., two pieces) are fixed on the rotary stanchion 14. On the other hand, guide members 25 (sliding or rolling) are provided on the arm 16. The guide members 25 move sliding or rolling along the rails 22 to move the arm 16 up and down ranging a low level of the lowest stage of table 5 in the pallet storage device 1 to a high level of the highest stage of table 5.

A nut 26 is screwed onto the ball screw 17. The nut 26 is fixed to a casing 27 of the arm 16, thus changing the rotation of the ball screw 17 into a vertical movement of the arm 16.

The arm 16 includes a grip arm 28 which is supported by the lifting/lowering casing 27 so as to linearly move in a plane intersecting the rotation axis A at right angles. The grip arm 28 is guided by e.g., engaging a guide key 29 attached on the casing 27 with a key groove 30 cut on the grip arm 28, so as not to rotate relative to the casing 27. In the casing 27 a linear motion actuator 31 is disposed. The linear motion actuator 31 may be a hydraulic cylinder as shown in FIG. 5, in which a piston rod 32 is fixed to a connection plate 33 fixed to the grip arm 28. The linear motion actuator 31 is not limited to the above hydraulic cylinder, but may be gearing or a link mechanism.

At the tip end of the grip arm 28, a grip finger section 34 is formed in a common shape so as to grip a pallet 7, e.g., by the holder 10.

Actuated by the linear motion actuator 31, the grip arm 28 is reciprocated between an extended position P1 (or the pallet removing/mounting position P1) at which the finger section 34 picks up or drops a pallet on the table 5 in the pallet storage device 1 and a contracted position P2 (or the transfer position P2) at which a pallet 7 picked up from the pallet storage device 1 or a pallet 7 to be put on the pallet storage device 1 is transferred on the exchange arm device 12 to or from the pallet storage device 1. A center line B of the arm 16 passing a center of a pallet 7 gripped by the finger section 34 and extending along the moving direction of the grip arm 28 is so arranged as to cross the rotation axis A.

A bellows 35 should be provided to prevent cutting chips or dust from attaching to the ball screw 17 while the arm 16 is moving up and down.

The pallet removing/mounting positions P1 from/on the pallet storage devices 1 by the finger section 34 of the arm 16 are arranged on a pitch circle with its center on the rotation axis A of the rotary stanchion 14 of the exchange arm device 1 at proper intervals. Therefore, the stroke of the grip arm 28 of the exchange arm device 12 becomes always constant when pallets are removed/mounted from/on the pallet storage devices 1. If the pallet storage devices 1 have the same size of tables 5, the centers of the tables 5 may fall on an identical pitch circle 43.

If a pallet exchange section of e.g., an index table 38 for removing/mounting pallets 7 from/on one set or two or more sets of machine tools 37 is arranged at a proper position P3 on the same pitch circle 36 as that on which the pallet removing/mounting positions P1 are located, the arrangement may be very favorable because a stroke of the grip arm 28 reqired when remo-ving/mounting pallets from/on machine tools 37 can be equal to the stroke of the grip arm 28 required when removing/mounting pallets from/on the pallet storage devices 1. A plurality of machine tools may be identical or different from each other, e.g., a lathe and other type of machine tools. They may be arranged as you like, for example close to each other or one pallet storage device may be arranged between two machine tools. For example, as shown in FIGS. 1 and 2, when a main spindle head to be used for a lathe is mounted on a horizontal axis line of an index table 38 for a machine tool, the machine tool may be used as lathe.

In this context, a pallet 7 is not directly removed/-mounted from/on the index table 38 for a machine tool 37, but it may be done through a pallet exchange section 39 standing alone separate from a machine tool 37. The stand-alone pallet exchange section 39 has a pallet mounting section 6' disposed at the delivery position P3 for delivering a pallet to the exchange arm device 12 and a shuffling arm 40. The shuffling arm 40 is rotatable about an axis 41 supported essentially in a horizontal plane, and has finger sections 41 at its both ends, which can grip or release the holder sections 10 of pallets 7 at the same time. In FIG. 1, the shuffling arm 40 rotates clockwise to allow the finger sections 41 to grip a pallet on the delivery position P3 and a pallet on the index table 38 at the same time. As soon as pallets are gripped, the shuffling arm 40 is raised to draw out pallets from the pallet exchange section 39 and the index table 38. Then, the shuffling arm 40 is rotated 180 degrees clockwise to shuffle pallets. Then, the shuffling arm 40 is lowered to mount shuffled pallets on the pallet exchange section 39 and the index table 38. Thereafter, the shuffling arm 40 is rotated 90 degrees counterclockwise to stanby at the home position as shown in FIG. 1.

A pallet setup device 42 may be disposed so as to arrange its delivery position P4 on a pitch circle 36 on which the pallet removing/mounting positions P1 of the pallet storage devices 1 are located.

On the pallet setup device 42, a machined workpiece on a pallet is removed manually or mechanically, and an unmachined workpiece or raw material is mounted in the empty pallet. Further, on the pallet setup device 42, the pallet mounting section 6 and the holding member 8 (not shown) for mounting pallets 7 may be disposed at two setup positions P5 and P6 other than the delivery position P4. This arrangement can set a pallet to be setup to the delivery position P4 from the setup position P5 or P6 manually or mechanically, while making a next setup preparatory operation at the setup position P5 or P6, thus eliminating a transfer time required by the exchange arm device 12 in the setup operation.

While exchanging pallets, the arm 16 of the exchange arm device 12 makes vertical movement and rotation at the same time or in sequence to stop at a position facing e.g., the pallet removing/mounting position P1 for a target pallet storage device 1. Next, the grip arm 28 extends to grip the holder 10 of a pallet 7 by the finger section 34. As soon as the pallet 7 is gripped, the arm 16 is raised, to draw out the pallet 7 from the pallet mounting section 6, and then brought to a stop. Next, the grip arm 28 is contracted to return to the transfer position P2. Then, the arm 16 is rotated and lowered, to bring the pallet to a position facing the delivery position P3 of the pallet exchange section 39 or the delivery posiition P4 of the pallet setup device 42. As soon as the pallet is brought to the position, the grip arm 28 extends to locate the pallet above a target pallet mounting section 6, and then the arm 16 is lowered to set the pallet 7 thereto. Then, the grip arm 28 contacts to standby at the transfer home position P2.

When receiving a pallet from the pallet exchange section 39 or the pallet setup device 42 to mount the pallet on the pallet mounting section 6 of a target pallet storage device 1, a reverse operation to the above is made.

On each of the pallet storage devices 1, while the exchange arm device 12 is performing an operation for another pallet storage device 1, the tables 5 of the remaining devices 1 independently rotate to bring next pallets 7 to be processed to the respective removing-/mounting position P1.

In this context, an operational sequence for small workpieces requiring a small machining time, but it goes without saying that this sequence can be applied for workpieces requiring a long machining time.

Figure 6:
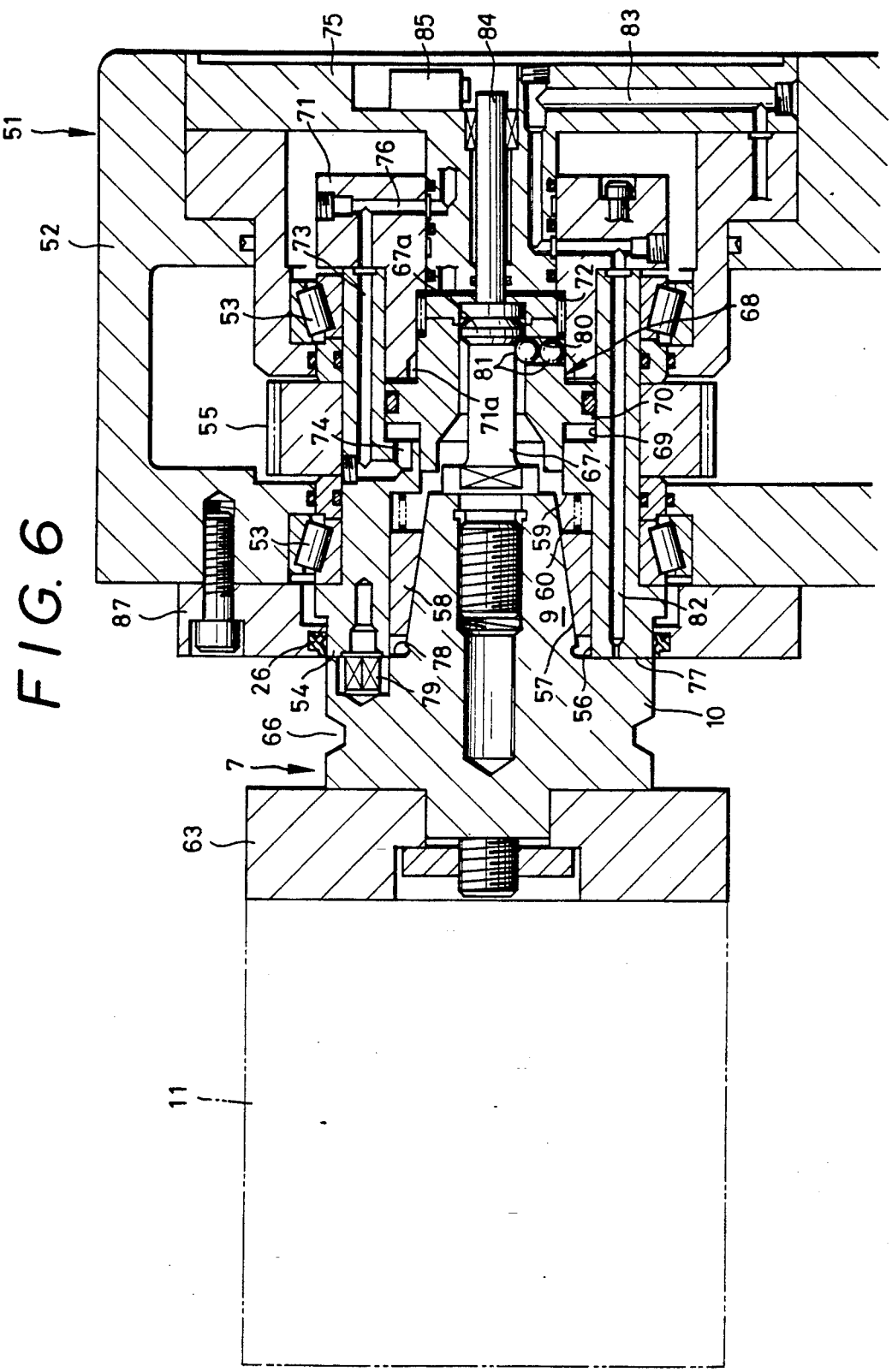
FIG. 6 is a sectional view showing the spindle stock of a lathe according to the invention.

In FIG. 6, the main spindle 54 of a lathe is rotatably supported by the bearing 53 in the casing 52 of the spindle stock 51. The main spindle 54 is fixed to the gearing 55 (not shown) to be rotated therethrough.

The tip end of the main spindle 54 is machined to a insertion section for a pallet. For example, the insertion section is an inner cylindrical surface 56 machined axially. A pallet is secured by the cylindrical surface 56 of the insertion section, a sleeve 58 having a tapered inner surface 57 fit onto the tapered end of the holder 10, and a spring 60 expanded between the sleeve 58 and the inner seat 59 formed in the main spindle to push the sleeve 58 toward the outside workpiece. The sleeve 58 should be provided with a locking means such as C ring (not shown) so as not to be pushed out far from the main spindle 54 by the force of the spring 60.

Each of pallets 7 to be mounted onto the main spindle 54 has a mounting 63 for fixing a workpiece 11 and a holder 10 to be fixed to the mounting 63. The holder 10 includes a taper shaft section 9 to be inserted into the insertion section of the main spindle 4 and a clamp groove 66 into which the arm of the exchange arm device is inserted for clamping the pallet during a pallet exchange operation. A clamp shaft 67 is integrally formed at or screwed into the tip end of the tapered shaft section 9. A clamp device 68 is installed into the main spindle 54 to clamp the clamp shaft 67.

In FIG. 6, the clamp device 68 is inserted into an internal cylindrical surface 69 formed at the rear end of the main spindle 54 slidably guided by a clamp piston 70 inserted thereon. The rear end of the main spindle 54 is fixedly covered by a spindle cover 71. A spring 72 is inserted and compressed between the clamp piston 70 and the spindle cover 21, to push the clamp piston 70 so as to release the clamping. Flow passages 73 are drilled in the spindle cover 71 and the spindle 54. Hydraulic pressure oil fed from the outside passes through the passages 73 to flow into a space through an outlet 74 drilled in the spindle 54 to push the side of the clamp piston 70 opposite to the spring 72. The center portion of a cover 75 fixed to the rear portion of a casing 52 of the spindle stock 51 extends into the inside of the spindle cover 71, in which a flow passage 76 is drilled to communicate the outside hydraulic oil source (not shown) to the flow passage 23.

A front end face 77 of the spindle 54 is formed to be at right angles with its axis, to function as a positioning surface by butting against the rear seat face 78 of the holder 10 of a pallet 7. In the front end face 77, a positioning pin 79 is fixed. When mounting a pallet 7, a positioning hole drilled in the front end face of the pallet 7 engages with the positioning pin 79, thus defining the circumferential relative positioning of the pallet 7 with the spindle 54.

When mounting a pallet 7, the tapered shaft section 9 is inserted into the tapered inside surface 57 of the sleeve 58. At that time, since the tapered shaft 9 and the tapered inside surface 57 of the sleeve 58 has an identical taper, the spring 60 pushes the sleeve 58 to bring the outer surface of the tapered shaft section 9 into close contact to the inner surface of the sleeve 58. After the tapered shaft section 9 is inserted into the insertion section of the spindle 54, pressure hydraulic oil is fed from a hydraulic source through the flow passages 76 to move the clamp piston 70 toward the right side on this figure against the force of the spring 22 by the hydraulic oil pressure drawn through the outlet 74.

One or two or more holes 80 are radially drilled in the clamp piston 70 to house two or more balls 81 therein. When the clamp piston 70 is moved toward the left side in the figure by the force of the spring 72, the balls 81 engage with an end stepped section 71a in the spindle cover 71, thus moving so a little far outside in the radial direction as not to drop out, permitting the flange section 67a of the clamp shaft section 67 of a pallet 7 to be moved for pallet removal/mounting operation without interference of the ball 81. When the clamp shaft section 67 is inserted and pressure oil flows out from the outlet 74, the clamp piston 70 is moved by the pressure to the right side in the figure against the force of the spring 72, thus causing the ball 81 to come into contact with the inner surface of the spindle cover 71, which limits the movement of the balls 81 toward the outside in the radial direction. Under this condition, the inner ball 81 engages with the flange section 67a of the clamp shaft section 67, thus causing the clamp piston 70 to clamp the clamp shaft section 67 of a pallet 7. And further the movement of the clamp piston 70 draws the pallet 7 toward the spindle 54, thus positively securing the pallet 7 to the spindle 54.

In the spindle 54, a flow passage 82 is drilled to open to the front end surface 77 through a nozzle, and the hydraulic pressure oil is supplied to the surface 77 from the hydraulic source through a flow passage 83 drilled in the cover 75. In the nozzle, whether the oil is flowing is detected, thus confirming the positive seating of the pallet 7 on the spindle 54. Further, a response of a switch 85, e.g., limit switch, is detected by a contact of an actuating bar 84 fixed to or integrally formed of the clamp piston 70, thus confirming the positive mounting of a pallet 7.

When hydraulic oil is discharged through the outlet 74 to lose the pressure, the clamp piston 70 is moved toward the left side in the figure by the force of the spring 72, thus allowing the pallet 7 to be drawn out.

A cover 97 having a seal member 86 at the front end of the casing 52 is fixed by bolts, to seal the inside thereof. Seal members may be provided at portions required.

Figure 7:
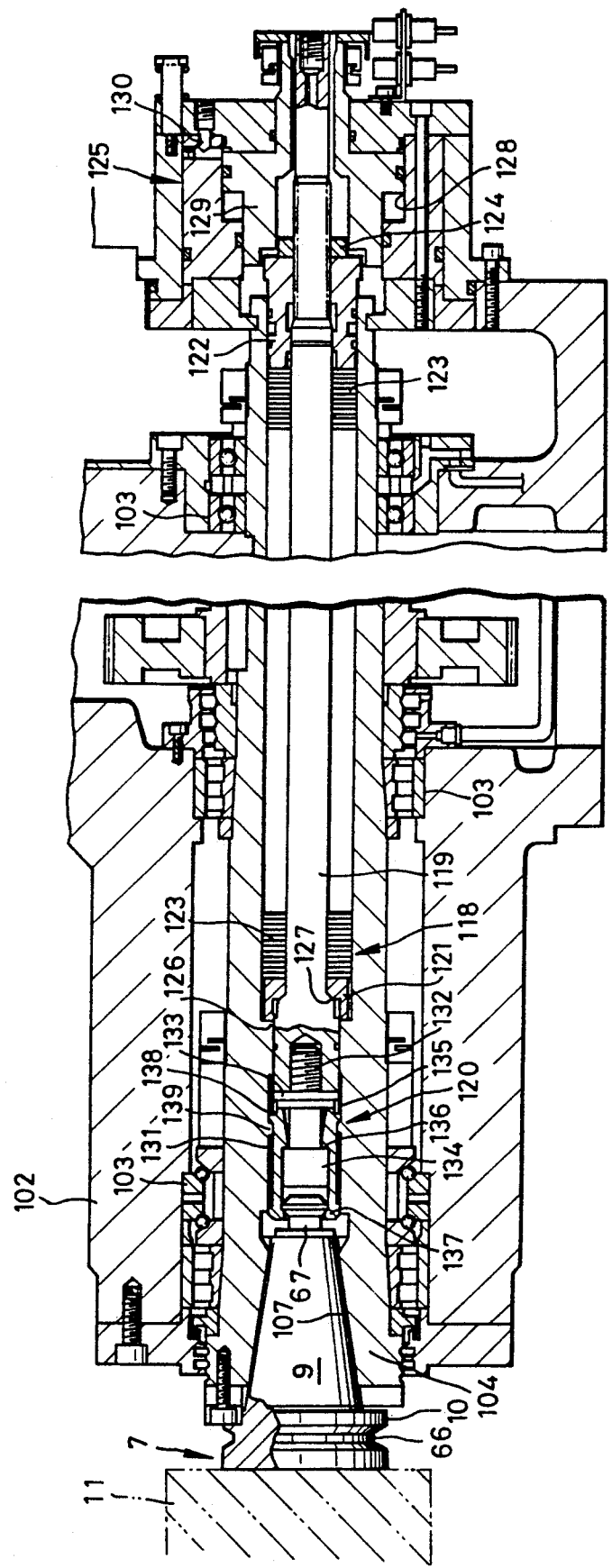
FIG. 7 is a sectional view showing another embodiment of the spindle stock of a lathe according to the invention.

The above description is made for the main spindle shown in FIG. 6, but it may be constructed as shown in FIG. 7.

In FIG. 7, the main spindle 104 is rotatably supported by bearing 103. The spindle 104 is attached with a gear 105, and rotated by a motor through a gearing (not shown).

At the front end of the spindle 104, a tapered inner surface 107 is formed as insertion section so as to get into close contact with the tapered shaft 9 of a pallet 7.

A clamp device 118 for clamping the clamp shaft 65 of a pallet 7 includes a rod 119 slidably guided in the inner cylindrical surface in the spindle 104, a collet 120 fixed to the tip end of the rod 119, a collar 121 and a sleeve 122 inserted onto the rod 119, a number of leaf springs 123 mounted between the collar 121 and the sleeve 122, and a press 125 for pushing the rod 119 toward the left side in the figure against the force of the springs 123. The sleeve 122 is screwed onto the rod 119, to function to adjust the force of the springs. The sleeve 122 is locked at the adjusted position by a nut 124 screwed onto the rod 119.

The collar 121 comes into contact with a stepped portion 126 on the spindle 104 and a stepped portion 127 on the rod 119 at its different portions, to limit their relative movement.

In the figure, the press 125 includes a piston 129 slidably guided by the inner surface of a cylinder 128 formed in the casing 102, the hydraulic oil supplied through an oil passage 130 moves the piston 129 toward the left side in the figure.

The collet 120 to be installed at the tip end of the rod 119 may be of a well known construction, having a claw 131 of a plurality of sector sections spaced from each other essentially at equal intervals in the circumferential direction, and a bolt 132 screwed into the tip end of the rod 119. The bolt 132 is formed with an intermediate flange 133 in contact with the end face of the rod 119 and with a head 134 at the free end, to limit the movement of one end of the claw 131 toward outside in the circumferential direction by a ring 135 attached on the intermediate flange 133. In the inner cylindrical surface of the claw 131, a stepped portion 136 is formed to come into contact with the head of the bolt 132 for prevention of its working loose in the axial direction. On the tip end of the claw 131 on the side of pallet 7, a projection 137 to project inside is formed so as to engage with a flange 67a of a clamp shaft 65.

The collet 120 moves to the left, following the movement of the rod 119 to the left side in the figure, when a projection 138 formed on the outer surface of the claw 131 is pressed down together with a ridge 139 formed on the inner surface of the main spindle 104, thus allowing the claw 131 to be rotated about a position in contact with the head 134 of the bolt 132, causing the projection 137 at the tip end of the claw 131 to release the clamp of the clamp shaft 65 of the pallet 7.

In the press 125, when hydraulic oil is supplied through the flow passage 130, the piston 129 is pushed to the left side in the figure, and finally gets into contact with the sleeve 122, thus causing the sleeve 122 also to be pushed to the left side in the figure, when at the same time the rod 119 also moves to the left side in the figure, thus causing the claw 131 of the collet 120 to be opened, resulting in the pallet 7 to be unclamped.

Under the above condition, the removing/mounting operation of the pallet 7 is performed. When it is detected that the pallet 7 has been inserted far into the insertion section or the tapered inner surface 107, the operation of the press 125 becomes ineffective. More particularly, the oil flow through the flow passage 130 is discharged free, thus loosing the oil pressure, and oil is supplied into the left side (in the figure) of the piston 129 through other passage as required.

The release of the operation of the press 129 in the above manner causes the sleeve 122 to be pushed toward the right side in the figure by the force of the leaf springs 123, and at the same time causing the rod 119 to be moved toward the right side in the figure. The movement of the rod 119 toward the right side in the figure causes the collet 120 to be drawn into inside of the spindle 104, when the tip end of the claw 131 comes into contact with the inner surface of the spindle 104 to be pushed down, thus permitting the projection 137 to clamp the clamp shaft 65 of the pallet 7 and draw it inside to secure it.

Figure 8:
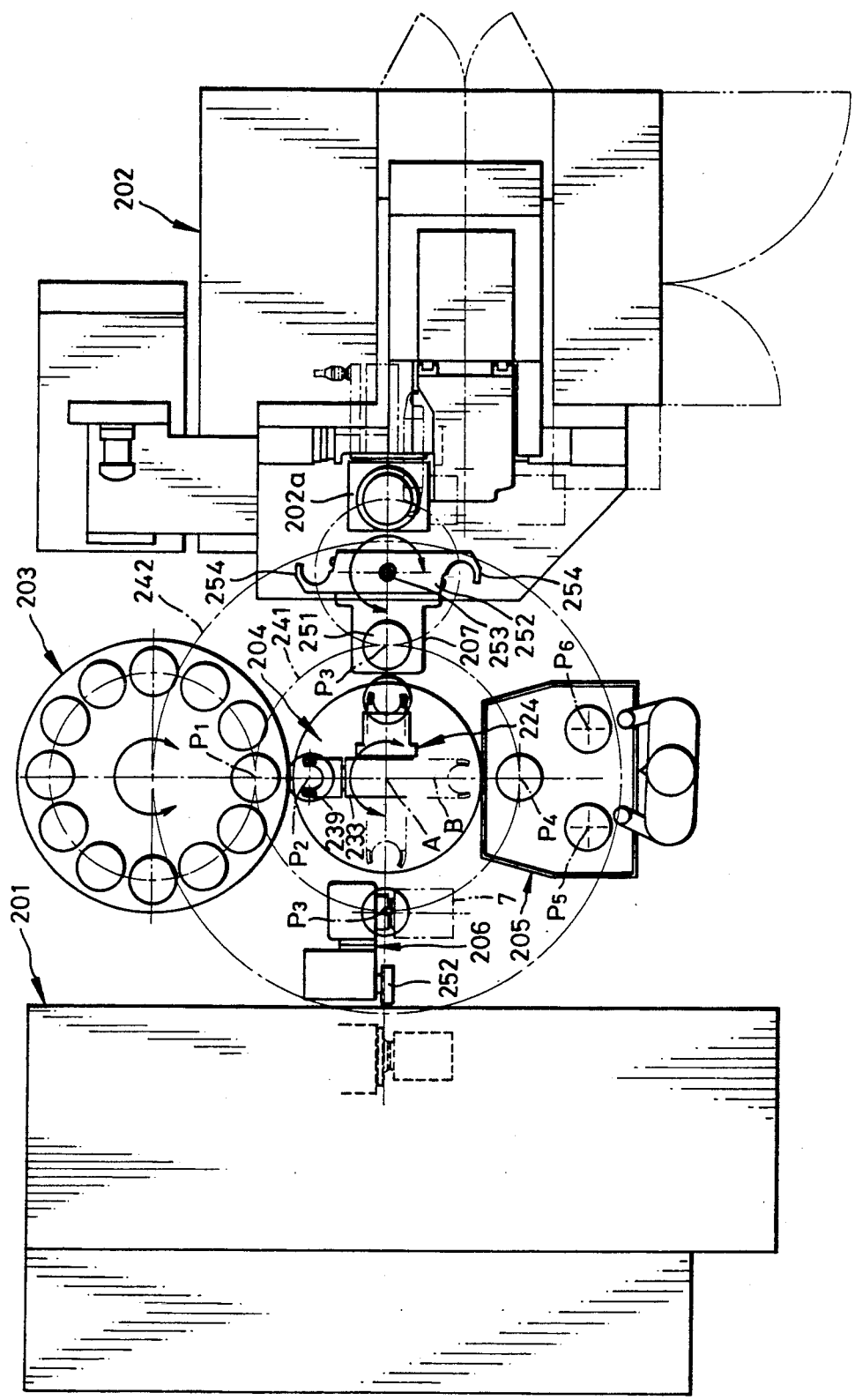
FIG. 8 is an exemplary plan view showing the positional relation among the lathe, other machine tool and the pallet exchange device.

FIG. 8 shows another embodiment of a system according to the present invention: In which, arranged are a lathe 201, a machine tool 202 having a machining center, a pallet storage device 203, an exchange arm device 204, and a setup table 205. The system can automatically and sequentially perform a machining of a workpiece fixed to a pallet by the lathe 201 and a following or preceding machining of the workpiece by the machine tool 202 using desirable tooling.

As shown in FIGS. 1 and 2, the pallet storage device 203 may be constructed of the bed 2, the stanchion 3 rotatably supported on the bed 2, the drive 4 supported on the bed 2 and rotating the stanchion 3, the tables (e.g., five pieces) 5 supported by the stanchion 3 and arranged vertically with spacing between each other. For detail refer to FIGS. 1 to 5.

On proper positions on a pitch circle 241 including a pallet removing/mounting position P1, arranged are pallet receiving positions P3 for pallet exchange devices 206 and 207 respectively for the lathe 201 and the machine tool 202, and a receiving position P4 for the setup table 205. This configuration favorably allows a stroke of a grip arm 233 of an exchange arm device 204 to be equal to that required for pallet exchange on a pallet storage device 204. The lathe 201 and the machine tool 202 may be respectively installed in a single unit or two or more units, or pallets storage devices 203 may be inserted between them.

For the machine tool 202, the pallet exchange (or shuffling) device 207 may be eliminated, in other words, pallets 7 may be directly shuffled using the grip arm 233 of the exchange arm device 204 on an index table 202a of the machine tool. Taking advantage of the construction of the grip arm 233 of the exchange arm device 204, the pallet exchange device 206 may be eliminated for the lathe 201 as well, and pallets 7 may be directly shuffled from/on the main spindles 4.

As shown in FIG. 8, the pallet exchange device 207 for the machine tool 202 has a pallet mounting section 251 (corresponding to the section 6' in FIG. 1) located at a delivery position P3 for pallet delivery and a shuffle arm 252 (corresponding to the arm 40 in FIG. 1), to be used for the exchange arm device 204 (corresponding to the device 12 in FIGS. 1 and 2). The shuffle arm 252 (corresponding to the arm 40 in FIG. 1) is rotatably about an axis 253 supported essentially in a flat plane, and at both ends provided is a finger section 254 (corresponding to the section 41 in FIG. 1) which can grip/release a holder 14 of a pallet 7 at the same time. In this figure, the shuffle arm 252 rotates clockwise, to allow the finger section 254 to grip a pallet in a delivery position P3 and a pallet on an index table 202a at the same time. With the pallets 7 gripped, the shuffle arm 252 moves up to draw out pallets from the pallet exchange device 207 and the index table 202a, and then rotates 180 degrees clockwise, to make shuffling of pallets. Next, the shuffle are 252 moves down to replace the shuffled pallets on the pallet exchange device 207 and the index table 202a. Then, the shuffle arm 252 rotates 90 degrees counterclockwise, to standby at the home position as shown in FIG. 3.

A pallet shuffling device 206 for the lathe 201 may have the similar construction to that for the pallet shuffling device 207 for the machine tool 202, but since the main spindle of the lathe 201 is placed horizontally while the axis of the index table 202a for the machine tool 202 in the direction of which a pallet is inserted is placed vertically, it requires means for changing posture of pallet 7. If the grip arm 233 for the exchange arm device 204 is so constructed that a pallet 7 can be removed/mounted at the delivery position P3 for the pallet exchange device 206 with the axis of a pallet 7 being placed horizontally, the pallet shuffling device 206 for the lathe 201 may be so arranged as if the pallet shuffling device 207 for the machine tool 202 is turned 90 degrees about the horizontal axis.

Figure 9:
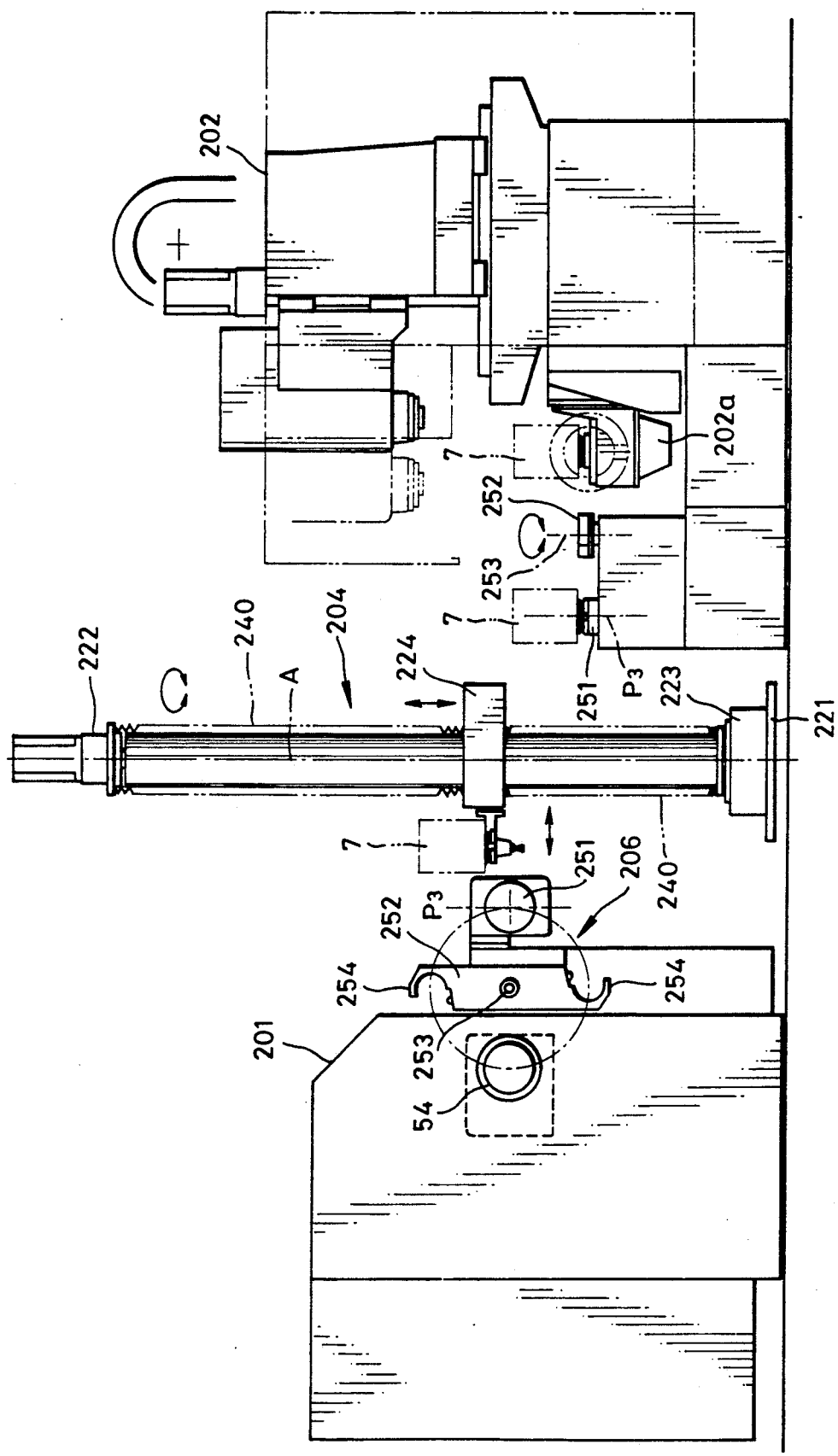
FIG. 9 is an exemplary front view showing the positional relation among the lathe, other machine tool and the exchange arm device.

Further, to remove/mount a pallet 7 at the delivery position P3 with the axis directed vertically, as shown in FIG. 9, the system may be so modified that the pallet mounting section 251 can be turned 90 degrees about the horizontal axis at the delivery position P3 and as shown in FIG. 8 the axis 253 of the shuffling arm 252 is placed horizontally. Thus, palltes can be shuffled in the same way as that in the pallet exchange device 207 for the machine tool 202. In this case, receiving a pallet at the delivery position P3, the pallet mounting section 251 is turned 90 degrees, and pallets are shuffled in the same way as that made by the above movement of the shuffling arm 252, and finally the pallet mounting section 251 is returned (rotated 90 degrees) to the original position, to standby for pallet delivery at the delivery position P3.

The pallet setup device 205 may be so arranged as to place a delivery position P4 on a pitch circle for the pallet removing/mounting position P1 for the pallet storage device 203.

On the pallet setup device 205, a machined workpiece on a pallet is removed manually, and the emptied pallet is mounted with a new workpiece unmachined yet. It goes without saying that the mounting/removing may be automatically made by machinery. In order to mount a pallet 7 having a construction similar to the one for the pallet storage device 203, the pallet setup device 205 may be provided with a pallet mounting section 216 and a holding member 218 e.g., at two setup positions P5 and P6 in addition to the delivery position P4. This arrangement can manually or with mechanical arm set pallets to the delivery positions P4 from the setup position P5 or P6, thus eliminating a transfer time required by the exchange arm device 204 during the setup operation.

In exchanging pallets, the arm 224 of the exchange arm device 204 moves up and down and rotates at a same time or in sequence, and then is brought to a stop at a position facing the pallet removing/mounting position P1 for the target pallet storage device 203. Then, the grip arm 233 extends out to allow the finger section 29 to grip the holder 10 of a pallet 7. With the pallet 7 gripped, the arm 224 goes up to draw out a pallet 7 from the pallet mounting section 216 and comes to a stop. Next, the grip arm 233 is contracted to return to the transfer position P2, and the arm 224 rotates and goes down, thus causing the pallet 7 to be brought to a stop at a position corresponding to the delivery position P3 for the pallet exchange device 206 or 207, or the delivery position P4 for the pallet setup device 205. After the stop, the grip arm 233 extends out to place the pallets above the target pallet mounting sections 251 and 216, and then the arm 224 goes down to mount the pallets 7 on the pallet mounting sections 251 and 216. After mounting, the grip arm 233 is contracted to standby at the home transfer position P2.

An operation just reverse to the above is made to mount pallets on a target pallet storage device 203, or the pallet exchange device 206 or 207, or the pallet mounting sections 251 and 216 for the pallet setup device 205 after the reception of pallets from the pallet exchange device 206 or 207 or the pallet setup device 205.

In each of the pallet storage devices 203, the tables 215 independently moves waiting (would-be-processed) pallets 7 to the respective removing/mounting positions P1, while the exchange arm device 294 is continuing its operation.

In this context, small workpieces taking a short machining time are exemplified on the embodiments, but it goes without saying that the embodiments can be applied for workpieces taking a long machining time.

What is claimed is:

1. A pallet exchange device for machine tools, comprising:

an exchange arm device having an arm with a grip finger section for gripping a pallet;
at least one machine tool, at least two pallet storage devices and a pallet setup device positioned around said exchange arm device;
said arm of said exchange arm device being rotatably supported on a vertical axis and being extendable and contractable with respect to said vertical axis;
said pallet storage devices each having a plurality of tables rotatably supported by a rotatable stanchion and vertically spaced on the respective stanchion with a predetermined spacing therebetween;
said tables each being provided with a plurality of pallet mounting sections distributed on a pitch circle that is coaxial with the respective rotatable stanchion, with a predetermined spacing between said mounting sections;
said pallet setup device having a delivery position;
said pallet storage devices and machine tool each having a pallet removing/mounting position, each said pallet removing/mounting position of said pallet storage devices and machine tool, and the delivery position on said pallet setup device, being arranged on a pitch circle coaxial with said vertical axis of said exchange arm device;
said pallet removing/mounting positions on said pallet storage devices comprising a position through which each pallet mounting section on said tables passes upon rotation of said tables; and
means for extending, contracting, rotating, and vertically moving said arm of said exchange arm device for selectively exchanging said pallet between said pallet storage devices, said machine tool and said pallet setup device.

2. A pallet exchange device for a machine tool as claimed in claim 1 wherein
said tables of said plurality of tables are rotatable independently of one another.

3. A pallet exchange device for a machine tool as claimed in claim 1, wherein
said tables are removable for exchange.

4. A pallet change device for a machine tool in accordance with claim 1, wherein
said pallet setup device comprises a table having at least two setup positions and pallet holding sections are provided at each said setup position of said table.

5. A pallet exchange device for a machine tool as claimed in claim 1, wherein
said machine tool has an index table, and further comprising
a pallet exchange section standing alone from said machine tool, said pallet exchange section comprising a pallet mounting section and a shuffling arm, said pallet mounting section of said pallet exchange section being positioned to receive pallets from said shuffling arm and from said exchange arm device and to deliver pallets to said shuffling arm and said exchange arm device, said shuffling arm being mounted to bring exchange pallets between said pallet mounting section and said for transferring exchange pallets between said pallet mounting section and said index table.

* * * * *